(12) United States Patent
Warner et al.

(10) Patent No.: US 7,727,170 B2
(45) Date of Patent: Jun. 1, 2010

(54) ELASTIC HYSTERETIC PALPATORY TRAINING APPARATUS AND METHOD OF USE THEREOF

(76) Inventors: Michael J. Warner, 130 Jennie La., Johnstown, PA (US) 15904-1200; James A. Mertz, 119 Taft Dr., Brick, NJ (US) 08724-2725

( * ) Notice: Subject to any disclaimer, the term of this patent is extended or adjusted under 35 U.S.C. 154(b) by 771 days.

(21) Appl. No.: 11/378,850

(22) Filed: Mar. 17, 2006

(65) Prior Publication Data

US 2006/0207381 A1 Sep. 21, 2006

Related U.S. Application Data

(60) Provisional application No. 60/662,632, filed on Mar. 17, 2005.

(51) Int. Cl.
*A61B 5/103* (2006.01)
*A61B 5/117* (2006.01)

(52) U.S. Cl. ........................ 600/595; 600/587

(58) Field of Classification Search ................ 600/587, 600/592, 594, 595; 482/121; 601/23
See application file for complete search history.

(56) References Cited

U.S. PATENT DOCUMENTS

| | | | | |
|---|---|---|---|---|
| 117,791 | A * | 8/1871 | Marks | 84/467 |
| 251,206 | A * | 12/1881 | Forbush | 434/166 |
| 2,202,202 | A * | 5/1940 | Hesse | 84/465 |
| 4,134,218 | A * | 1/1979 | Adams et al. | 434/267 |
| 5,538,488 | A * | 7/1996 | Villepigue | 482/47 |
| 5,738,613 | A * | 4/1998 | Clayton | 482/47 |
| 6,033,370 | A * | 3/2000 | Reinbold et al. | 600/595 |
| 6,159,168 | A | 12/2000 | Warner et al. | |

OTHER PUBLICATIONS http://www.me-us.com/kat_displacement.htm; "Laser Displacement Sensor. Optical Displacement Sensor: Micro Epsilon"; Mar. 7, 2006; ( 3 pages).

http://www.micro-epsilon.com/en/Sensors/Capactive/; Non-Contacting Capacitive Displacement Measuring|capaNCDT|Micro-Epsilon; Mar. 7, 2006; (2 pages).

Y.C. Fung; "Biomechanics-Mechanical Properties Of Living Tissues"; Second Edition; Springer-Verlag, New York, Inc.; 1993; (pp. 242-320).

(Continued)

*Primary Examiner*—Max Hindenburg
*Assistant Examiner*—Adam J. Eiseman
(74) *Attorney, Agent, or Firm*—The Webb Law Firm

(57) ABSTRACT

An apparatus for elastic hysteretic palpatory training includes a wire or a computer controlled actuator having a plunger that at least partially elastically resists the application of a palpatory force. In use of the apparatus, an increasing palpatory force is applied to an end of the wire transverse to its axis or an end of the plunger of the actuator in a first direction. In response to the applied palpatory force, the wire or the plunger elastically resist displacement from a first position to a second position. The palpatory force is then withdrawn whereupon the elasticity of wire or the elasticity emulated by the plunger causes it to return toward the first position. The applied palpatory force versus displacement is detected in response to applying and withdrawing the palpatory force to the wire or the plunger.

10 Claims, 12 Drawing Sheets

OTHER PUBLICATIONS

William A. Kuchera, Do, Faao and Michael L. Kuchera, Do, Faao; "Osteopathic Principles In Practice"; Greyden Press, Original Works Books, Columbus, Ohio; Revised Second Edition; 1994; (pp. 85-116).

Christopher Maher and Roger Adams; "Reliability Of Pain And Stiffness Assessments In Clinical Manual Lumbar Spine Examination"; Physical Therapy/vol. 74, No. 9/ Sep. 1994; (pp. 801-811).

Christopher Maher and Roger Adams; "Is The Clinical Concept Of Spinal Stiffness Multidimensional?"; Physical Therapy/vol. 75, No. 10/ Oct. 1995; (pp. 854-864).

Michael J. Warner, Do, James A. Mertz, MS and Adam S. Zimmerman, Do; "The Hysteresis Loop As A Model For Low Back Motion Analysis"; JAOA; Vol. 97; No. 7; Jul. 1997; (pp. 392-398).

Joseph D. Bronzino; "The Biomedical Engineering Handbook"; Second Edition; vol. 1; CRC Press LLC; 2000; (pp. 18-1-18-19 and 22-1-22-8).

* cited by examiner

ELASTIC HYSTERETIC PALPATORY TRAINING APPARATUS AND METHOD OF USE THEREOF

CROSS REFERENCE TO RELATED APPLICATION

This application claims the benefit of U.S. Provisional Patent Application No. 60/662,632, filed Mar. 17, 2005, the contents of which are incorporated herein by reference.

BACKGROUND OF THE INVENTION

1. Field of the Invention

The present invention relates to palpation as practiced in all fields of medicine by any class of practitioner including lay practitioners. It also relates to the human ability to sense through touch elastic and hysteretic behavior in living or dead organic material (tissue) and inorganic material.

2. Description of Related Art

Palpation is an integral component of a thorough medical examination. Physicians or medical practitioners are able to assess the body and make a diagnosis based on palpatory skill. Palpatory findings also guide hands-on treatment of the body for therapeutic purposes. Until now, the science behind the art of palpation has been poorly understood.

Health care providers who practice manual manipulative medicine, for example, claim to have abilities to detect and treat subtle dysfunctions of the neuromusculoskeletal system. Palpation is often the most important factor, if not the only factor, guiding diagnosis and treatment.

Of particular interest is the assessment of motion quality in terms of tissue response. This is more than a degree of range of motion. Tissue response is how the body reacts to energy transfer. It is the result of a given force supplied, maintained and withdrawn. Terms such as ease of motion and stiffness have been used to describe this dimension of palpatory diagnosis.

Studies have been conducted and reported to define and quantify elasticity, stiffness and motion quality of the human body. These studies, however, have not been able to correlate the mechanical and clinical concepts of elasticity, stiffness and motion quality. Palpation involves practitioner assessment of elasticity, stiffness and motion quality and the hysteretic effect that such tissue presents to the practitioner.

Other studies attempting to measure elasticity, stiffness and motion quality have been unsuccessful because they could not establish a correct measurement parameter for palpation. More specifically, these studies used a palpatory model and found a high degree of inter-practitioner correlation. However, palpatory techniques learned on this model did not translate to palpation of human tissue, and thus showed poor inter-practitioner correlation on human tissue.

In addition, the inorganic mechanical model used for these studies used only elastic components. That is, this inorganic model used springs that had an elastic coefficient of 1.0. In other words, the model was fully (completely) elastic, lacked inelastic features and did not have inelastic moving parts to palpate, i.e., individual parts having an elastic coefficients valued between 0.0, completely inelastic, and 1.0, completely elastic. Thus, this model did not have any hysteretic effect to present to the palpating practitioner. The practitioner's only learned the differences between elastic moving parts. When palpating human tissue, poor inter-practitioner correlation resulted because an understanding of the effects of hysteresis was missing.

It would, therefore, be desirable to provide an inorganic elastic hysteretic palpatory training device and method of use thereof that can provide to the practitioner, upon palpation, both elastic and hysteretic response.

SUMMARY OF THE INVENTION

The invention is an elastic hysteretic palpatory training apparatus that includes means for elastically resisting an applied palpatory force; means for supporting the means for elastically resisting such that said means for elastically resisting is moveable in response to the application of the palpatory force; and means for measuring displacement of the means for elastically resisting in response to the application of the palpatory force thereto.

The palpatory force can be applied via a finger, fingertip, and or any sensory part of a user that is utilized for applying the palpatory force.

The apparatus can further include means for measuring an amount of palpatory force applied to the means for elastically resisting. The means for measuring can be disposed on either a finger, fingertip, hand or any sensory part of a user that is utilized for applying the palpatory force or on the means for elastically resisting.

The means for elastically resisting can include either a wire having a coefficient of elasticity between 0.0 and 1.0, exclusive, wherein said wire is disposed on the means for supporting for elastically deforming transverse to a longitudinal axis of said wire; a series of wires supported by the means for supporting in a manner to be engaged one-at-a-time in response to the application of an increasing palpatory force on one of said wires in said series, wherein each wire has a coefficient of elasticity between 0.0 and 1.0, exclusive, and each wire is disposed on the means for supporting for elastically deforming transverse to a longitudinal axis of said wire; or an actuator operating under the control of a controller which is configured to cause a moveable element of the actuator to emulate at least one of: an elastic material responding to the application of the palpatory force; and a series of elastic materials being engaged one-at-a-time in response to the application of the palpatory force.

The means for elastically resisting can be partially elastic.

The means for measuring displacement can include at least one of: the combination of a measure having graduations positioned along a direction of displacement of the means for elastically resisting in response to the application thereto of the palpatory force and a sighting device spaced from said measure and said means for supporting, said sighting device configured to coact with said measure and/or said means for supporting for enabling a user to establish a visual sight plane from which displacement of the means for elastically resisting can be determined by reference to the graduations of the measure; or means for electronically measuring displacement of the means for elastically resisting.

The means for electronically measuring displacement can include one of an LVDT, an eddy current displacement sensor, an inductive displacement sensor, a capacitive displacement sensor, and a laser displacement sensor.

The invention is also a method of elastic hysteretic palpatory training. The method includes (a) providing a means that at least partially elastically resists the application of a palpatory force; (b) applying an increasing palpatory force to said means in a first direction whereupon said means elastically resist displacement from a first position to a second position; (c) following step (b), withdrawing the palpatory force applied to said means in the first direction whereupon the elasticity of said means causes it to return toward the first position; and (d) detecting applied palpatory force versus displacement in response to applying and withdrawing the palpatory force to said means.

The palpatory force can be applied by pressing said means in the first direction.

The method can further include, following step (c), the steps of: applying an increasing palpatory force to said means in a second, opposite direction whereupon said means elastically resist displacement toward a third position; withdrawing the palpatory force applied to said means in the second direction whereupon the elasticity of said means causes it to return toward the first position; applying an increasing palpatory force to said means in the first direction whereupon said means elastically resist displacement toward the second position; and withdrawing the palpatory force applied to said means in the first direction whereupon the elasticity of said means causes it to return toward the first position.

The palpatory force can be applied to said means in the second direction by pressing or lifting.

The invention is also an elastic hysteretic palpatory training apparatus comprising an elongated wire having a coefficient of elasticity between 0.0 and 1.0, exclusive; means for supporting a first part of the wire with a second part of the wire spaced above a surface; a sighting device spaced from the means for supporting adjacent the second part of the wire, the combination of the sighting device and the means for supporting defining a sight plane; and a measure disposed between the sighting device and the means for supporting, the measure having graduations between the surface and the first part of the wire for enabling a user palpating the second end of the wire to determine a displacement thereof with respect to the sight plane.

The means for supporting can be a block coupled to the surface wherein the first end of the wire is either coupled to a surface of the block or is received in an aperture defined in the block.

The apparatus can further include a plurality of wires disposed on the means for supporting in a manner to be engaged one-at-a-time in response to movement of one of said wires of said plurality of wires in a first direction, wherein each wire has a coefficient of elasticity between 0.0 and 1.0, exclusive.

Lastly, the invention is an elastic hysteretic palpatory training apparatus comprising: a plunger; a solenoid disposed around a longitudinal axis of the plunger; and a controller for controlling electrical power supplied to the solenoid as a function of a palpatory force applied to an end of the plunger and a position of the plunger in the solenoid in response to the applied palpatory force such that the plunger emulates at least one of an elastic material responding to the application of the palpatory force thereto or a series of elastic materials being engaged one-at-a-time in response to the application of the palpatory force thereto.

The apparatus can further include means for measuring displacement of the plunger in the solenoid. The controller can be operative for processing an output of the means for measuring displacement and for controlling the electrical power supplied to the solenoid as a function thereof.

DETAILED DESCRIPTION OF THE INVENTION

The present invention will be described with reference to the accompanying figures where like reference numbers correspond to like elements.

Figure 1:
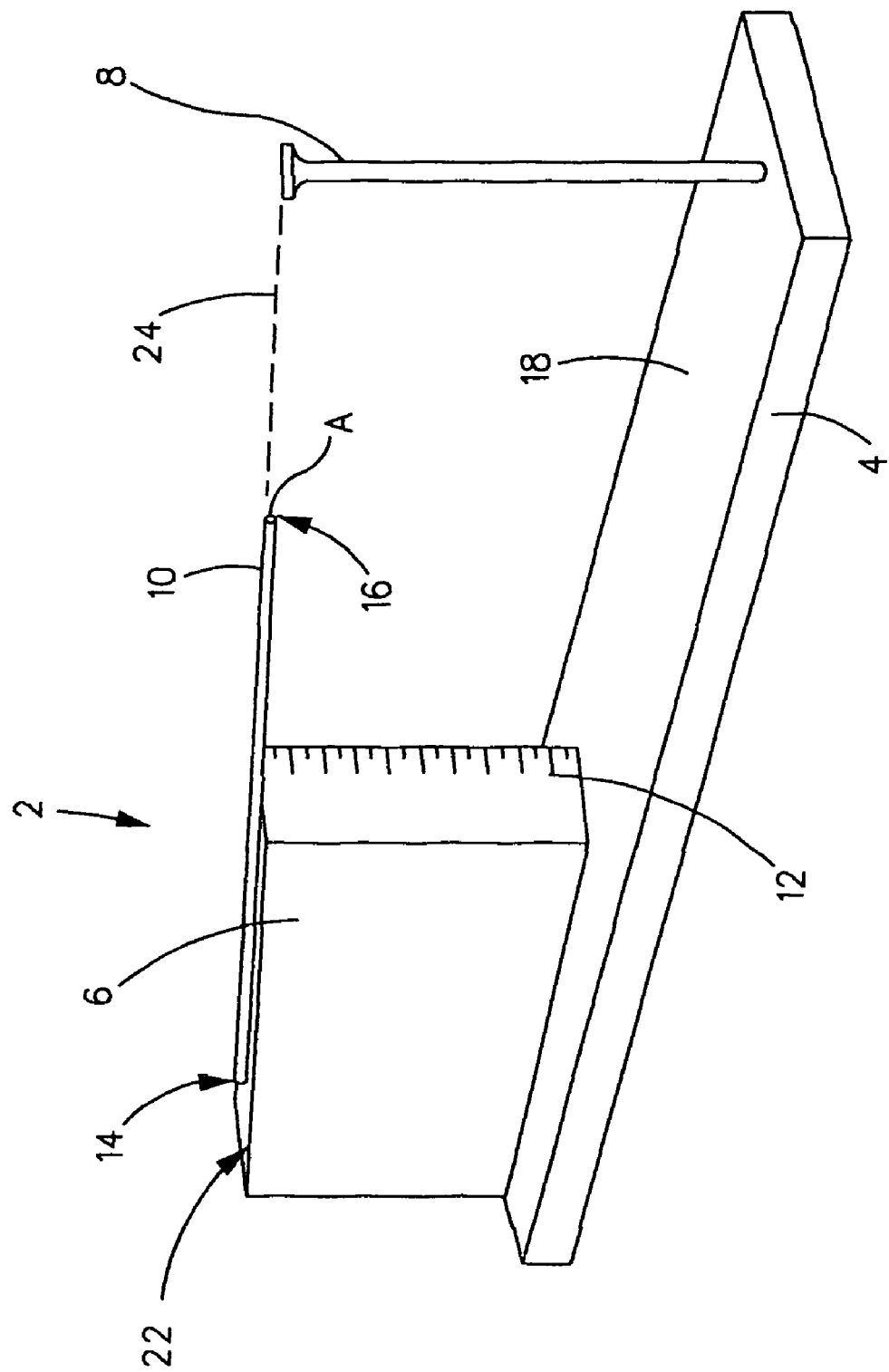
FIG. 1 is a perspective view of a first embodiment elastic hysteretic palpatory training apparatus in accordance with the present invention.

With reference to FIG. 1, a first embodiment elastic hysteretic palpatory training apparatus 2 includes a base 4 having an elevating block 6 and a sighting device 8, such as, without limitation, a nail, positioned at opposite ends of base 4 and a length of wire 10 made of a suitable and/or desirable elastic hysteretic (EH) material, such as 99% copper and/or any other suitable and/or desirable material(s), and a measure or calibrated scale 12 positioned on or adjacent an end of elevating block 6 facing sighting device 8. Measure 12 includes a series of graduations or marks that are visible to a user when viewing measure 12 from the sighting device 8 end of base 4.

Wire 10 is positioned on a side of elevating block 6 opposite base 4 with a first end 14 of wire 10 affixed to elevating block 6 in any suitable and/or desirable manner, e.g., staples, and a second end 16 of wire 10 extending toward and terminating intermediate elevating block 6 and sighting device 8 in spaced relation to a top surface 18 of base 4. In the embodiment shown in FIG. 1, the graduations of measure 12 are oriented to enable a user to detect displacement of wire 10 in a direction normal to surface 18 of base 4.

Figure 2:
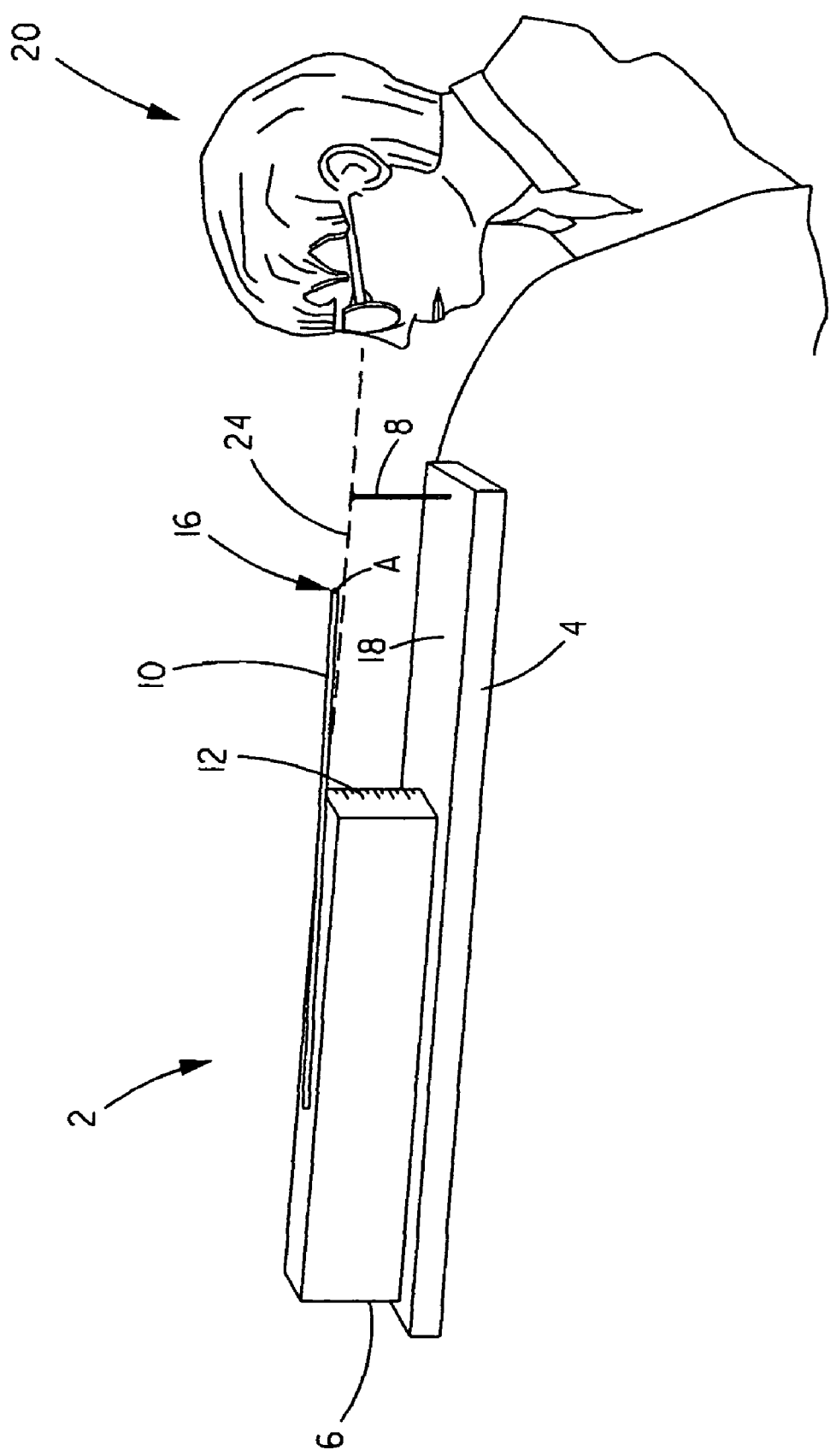
FIGS. 2-5 are progressive views of a user applying a progressively increasing palpation force to the apparatus shown in FIG. 1.

With reference to FIG. 2 and with continuing reference to FIG. 1, in use of apparatus 2, a user 20 peers over the end of sighting device 8 which is positioned on or about the same height as a top surface 22 of elevating block 6 along a sight line 24 (shown in phantom) of user 20.

Figure 3:
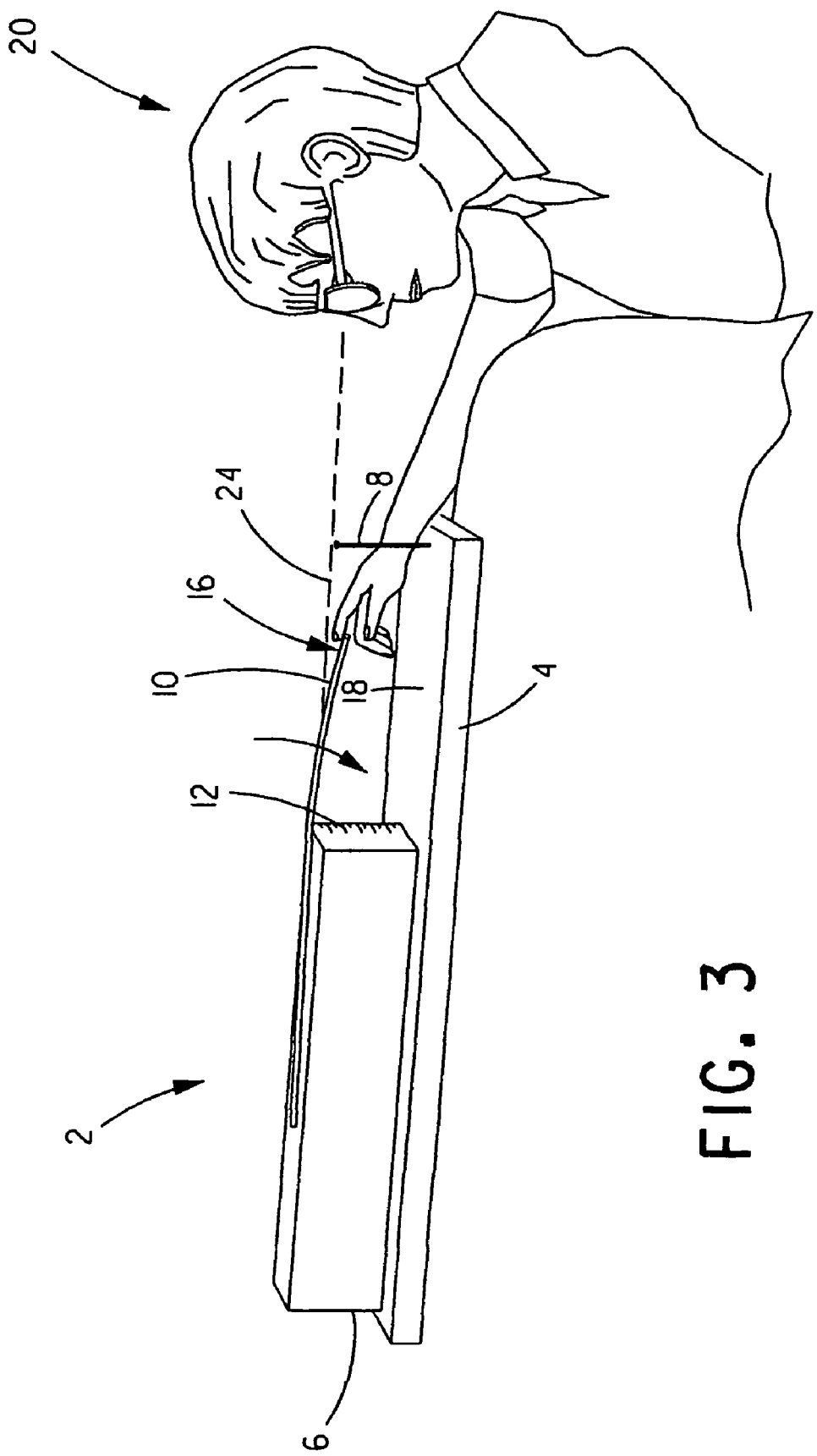

With reference to FIG. 3 and with continuing reference to FIGS. 1 and 2, at a suitable time after user 20 has established sight line 24, user 20 depresses second end 16 of wire 10 with a downward palpatory force that causes second end 16 of wire 10 to displace downward from sight line 24.

Figure 4:
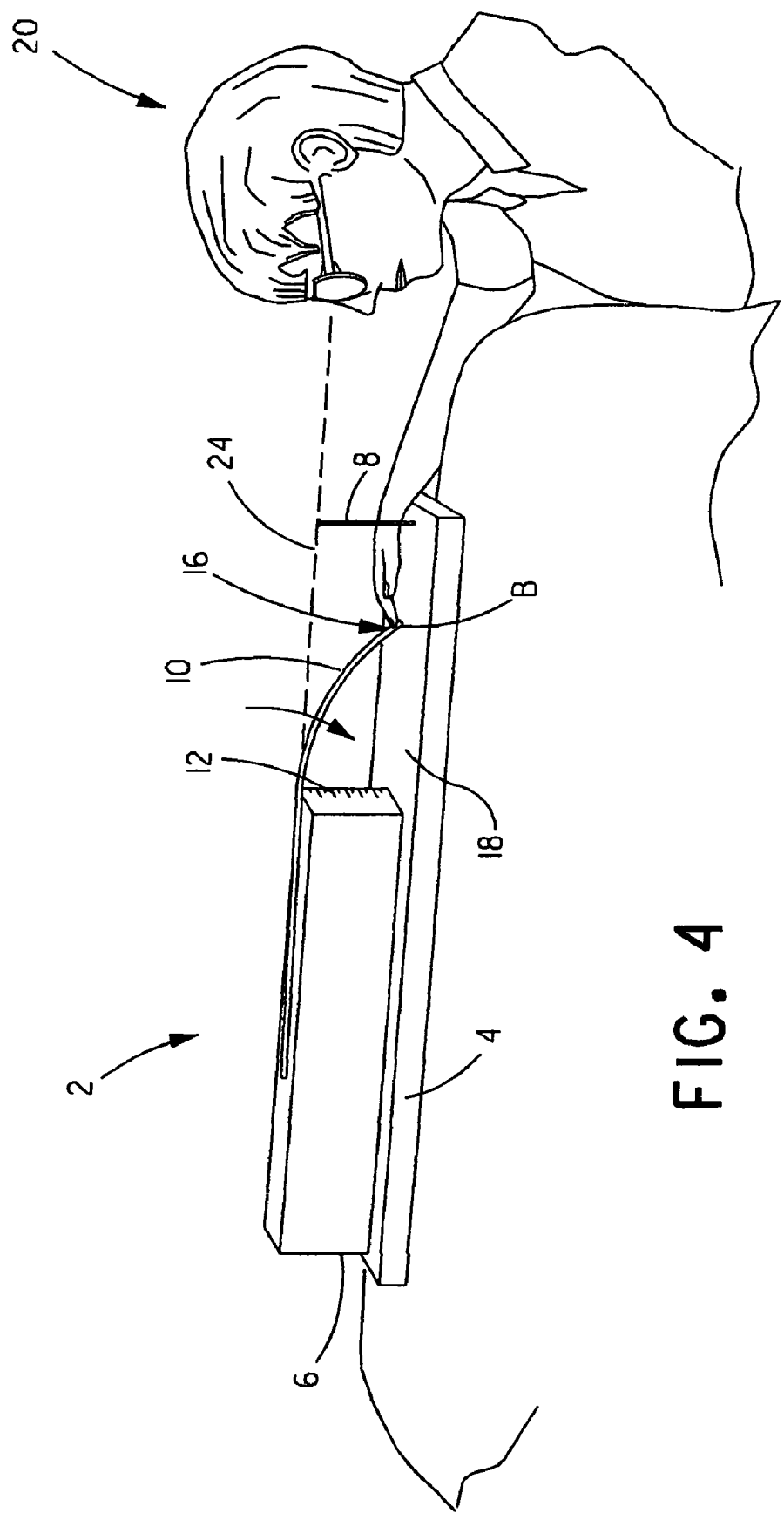
Figure 5:
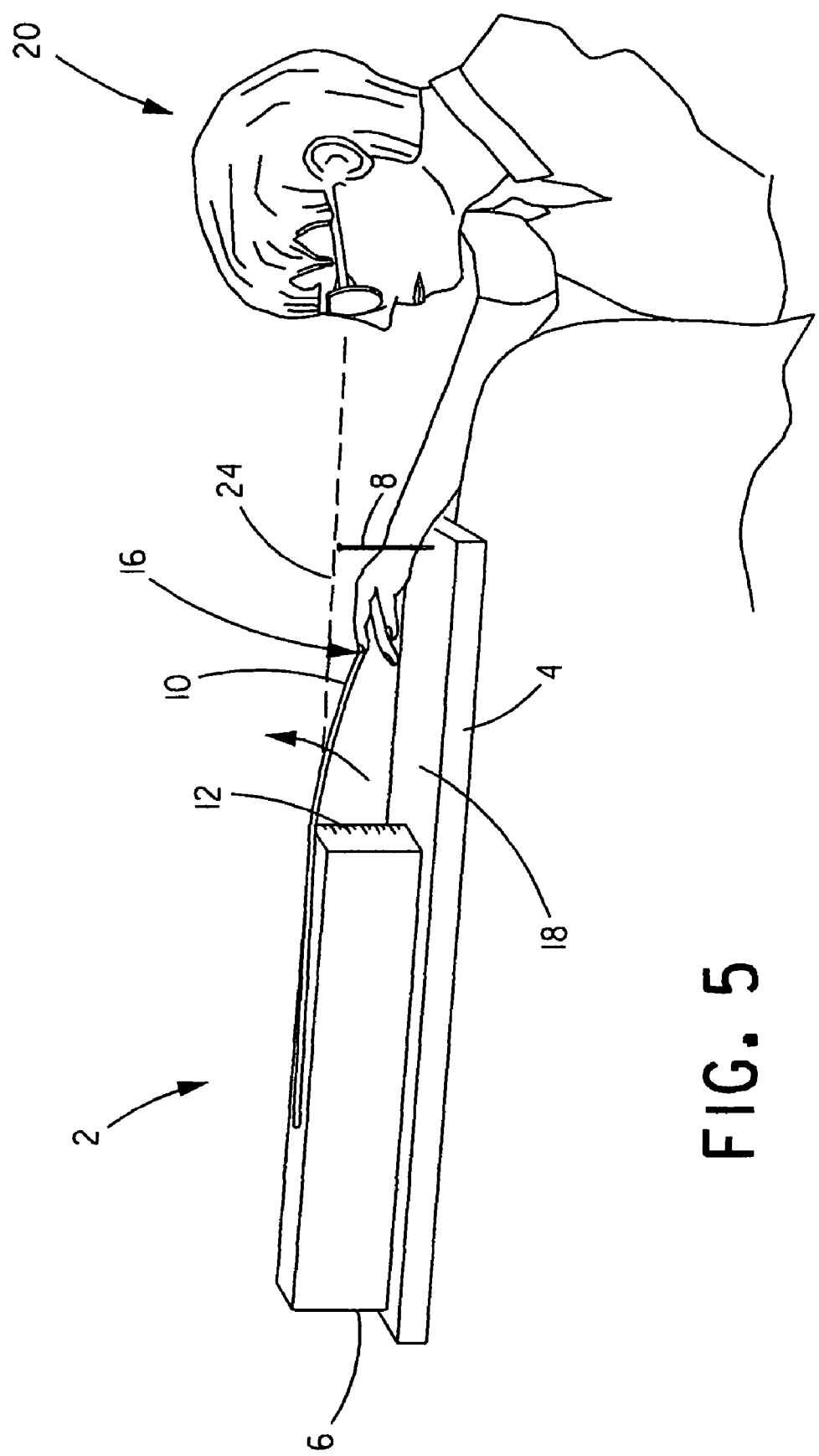

With reference to FIG. 4 and with continuing reference to FIGS. 1-3, user 20 continues applying an increasing downward palpatory force to second end 16 of wire 10 until second end 16 is just above top surface 18 of base 4. Next, as shown in FIG. 5, user 20 withdraws the downward palpatory force on second end 16 of wire 10 whereupon the elasticity of wire 10 causes second end 16 to return to a position intermediate the first position A shown in FIG. 2 and the second position B shown in FIG. 4.

Figure 6:
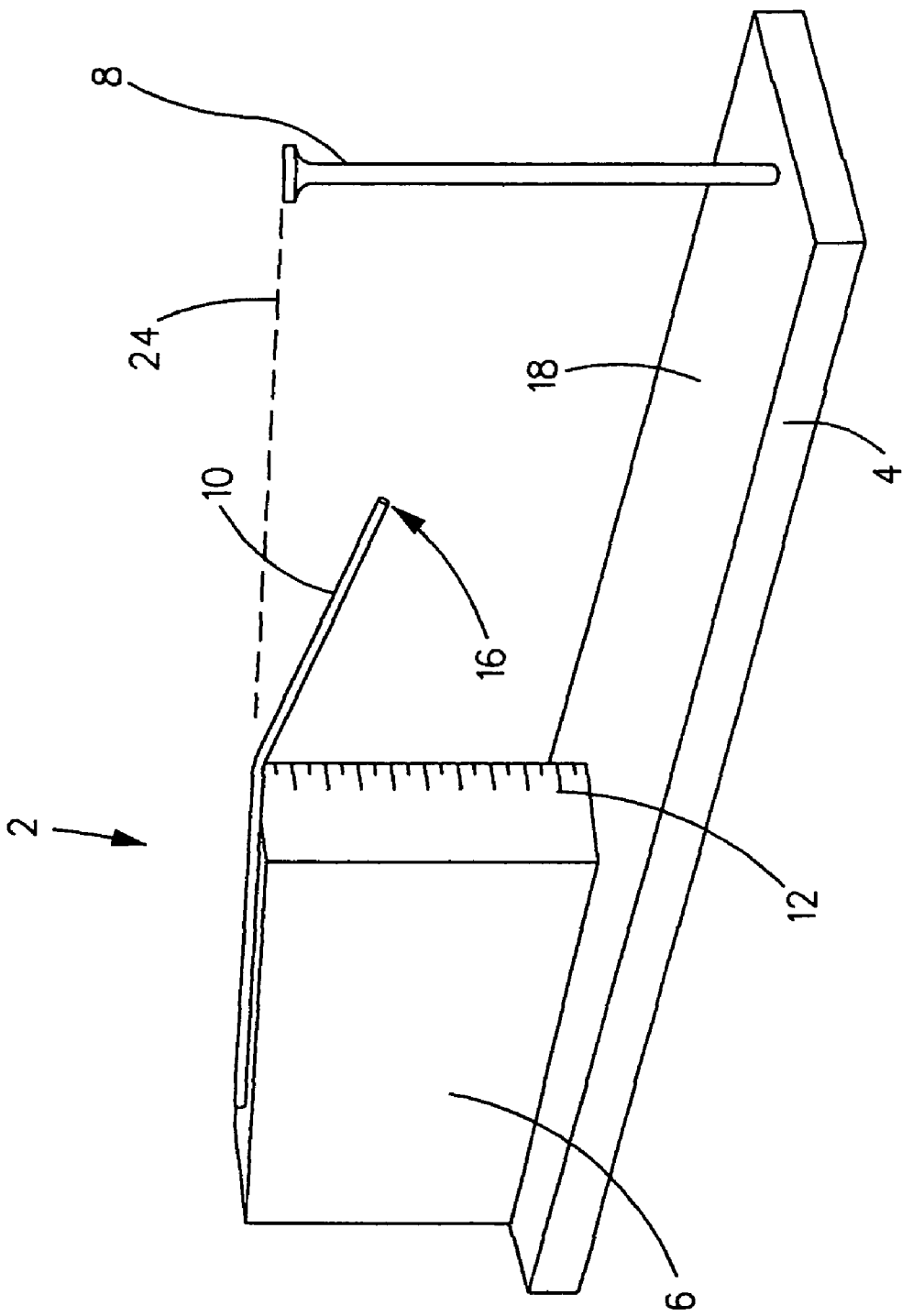
FIG. 6 is a perspective view of the apparatus shown in FIG. 1 after palpation by the user in FIGS. 2-5.

With reference to FIG. 6 and with continuing reference to all previous figures, upon releasing the downward palpatory force from second end 16 of wire 10, second end 16 remains at a residual displacement (called retentivity) as shown. As a result of this retentivity, it can be concluded that wire 10 is somewhat inelastic (or elastic) and has hysteresis. In other words, wire 10 is hysteretic. Had wire 10 been fully elastic (having a coefficient of elasticity of 1.0), upon releasing the downward palpatory force, second end 16 of wire 10 would have returned to the first position A shown in FIG. 2. In contrast, had wire 10 been fully inelastic (having a coefficient of elasticity of 0.0), upon withdrawing the downward palpatory force, second end 16 of wire 10 would have remained at the second position B shown in FIG. 4.

Figure 7A:
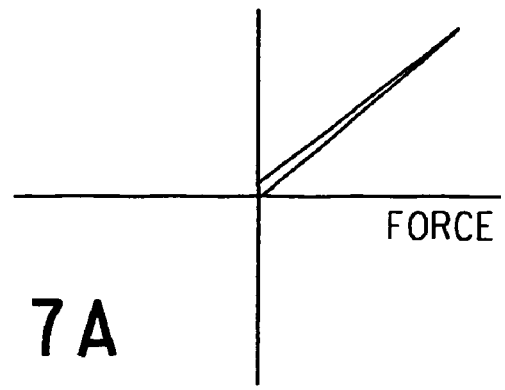
FIGS. 7A-7C are first quadrant hysteresis curves for materials having coefficients of elasticity near 1.0, between 0.0 and 1.0, and 0.0, respectively.
Figure 7B:
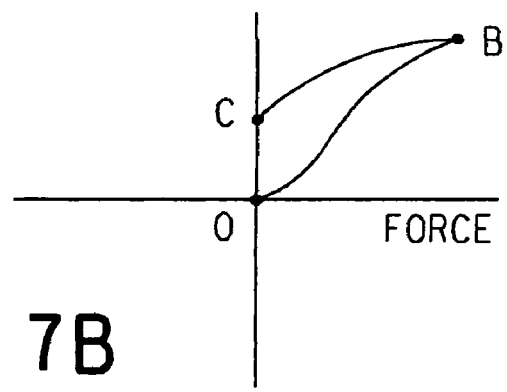
Figure 7C:
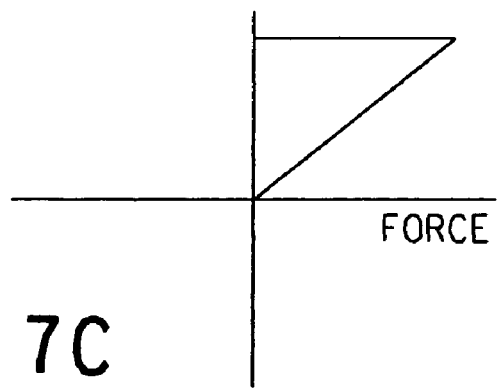

With reference to FIGS. 7A-7C, partial (first quadrant) hysteresis curves of elastic tissue, somewhat elastic tissue and inelastic tissue having coefficients of elasticity near 1.0, between 0.0 and 1.0, and near 0.0, respectively, are shown. As can be appreciated from the foregoing description of the movement of wire 10 in FIGS. 2-6, wire 10 would generate the force versus displacement curve shown in FIG. 7B since, upon removal of the downward palpatory force, second end 16 of wire 10 does not return to the first position A shown in FIG. 2. The first position A of second end 16 of wire 10 is denoted by "0" (origin) at the intersection of the force versus displacement axes shown in FIG. 7B. The second position B of second end 16 of wire 10 is denoted by "B" in FIG. 7B. Lastly, the position of second end 16 of wire 10 intermediate the first position A and the second position B shown in FIG. 6 is denoted by "C" in FIG. 7B. Because of the semi-elastic nature of wire 10, user 20 can detect or realize the force versus displacement curve shown in FIG. 7B in response to moving second end 16 of wire 10 in the manner shown in FIGS. 2-6.

Figure 8A:
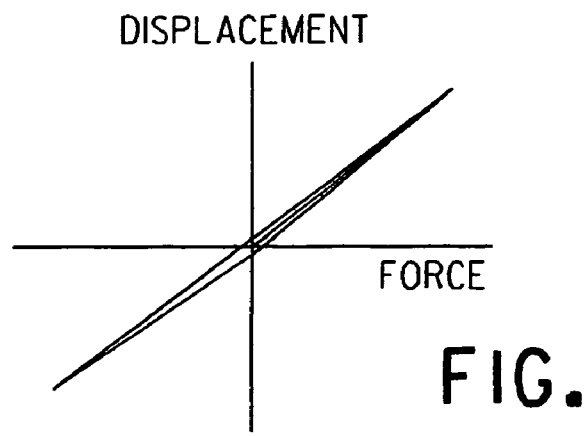
FIGS. 8A-8C are full hysteresis loops of materials having coefficients of elasticity of near 1.0, between 0.0 and 1.0, and near 0.0, respectively.
Figure 8B:
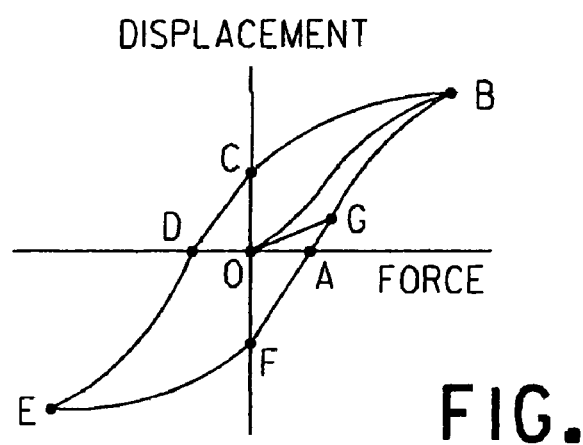
Figure 8C:
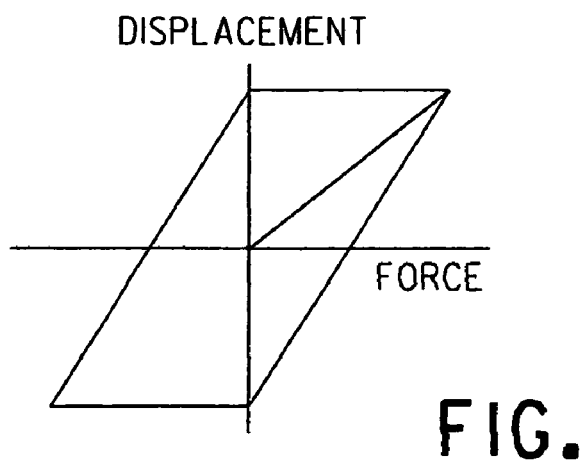

FIGS. 8A-8C show full (first through fourth quadrant) hysteresis curves corresponding to the partial hysteresis curves shown in FIG. 7A-7C, respectively. The curves of FIGS. 8A-8C would be realized by user 20 if user 20 were to apply a complete cycle of downward, upward and downward palpatory forces to second end 16 of wire 10. The application of an upwardly directed palpatory force by user 20 to second end 16 of wire 10 from the position shown in FIG. 6 will now be described.

Figure 9:
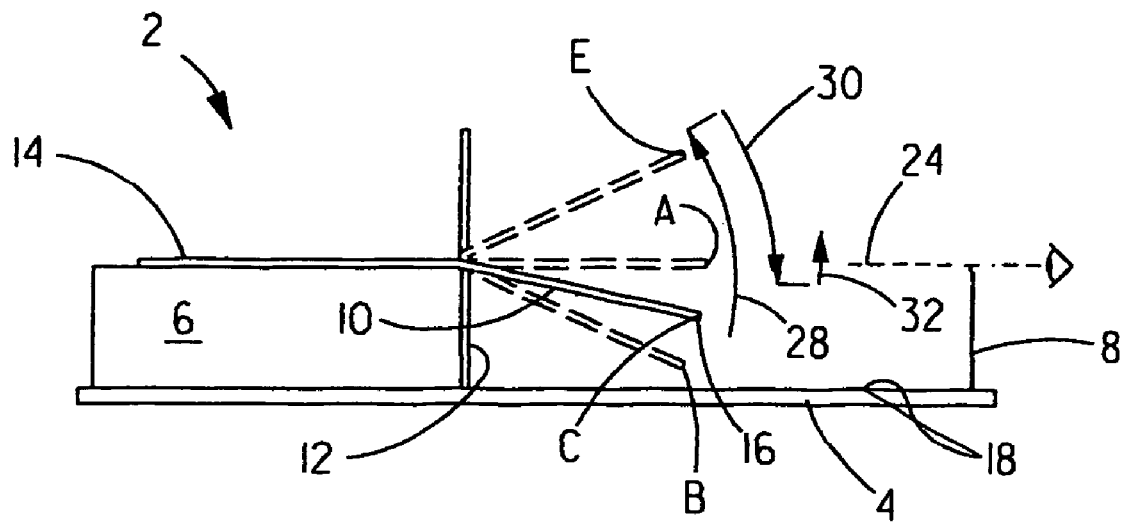
FIG. 9 is a side view of the apparatus shown in FIG. 1 illustrating the application of an upwardly and downwardly directed palpatory forces thereto.

With reference to FIG. 9 and with continuing reference to all previous figures, starting from the position shown in FIG. 6, user 20 applies an upwardly directed increasing palpatory force to second end 16 of wire 10 that causes second end 16 to move upwardly to a third position E. The movement of second end 16 from the position shown in FIG. 6 (position C in FIG. 9) to third position E is shown by arrow 28 in FIG. 9. Thereafter, user 20 withdraws the upwardly directed palpatory force on second end 16 of wire 10 whereupon the elasticity of wire 10 causes it to return to a position intermediate first position A and third position E. Upon release of the upwardly directed palpatory force, second end 16 of wire 10 will have a residual displacement (retentivity) between first position A and third position E.

Next, user 20 applies a downwardly directed increasing palpatory force to second end 16 of wire 10 whereupon second end 16 moves to a position slightly below sight line 24. The movement of second end 16 from third position E to a position slightly below sight line 24 is shown by arrow 30 in FIG. 9. Upon release of this downwardly directed palpatory force, the elasticity of wire 10 causes it to displace upwardly as shown by arrow 32 in FIG. 9, desirably to first position A.

The movement of second end 16 of wire 10 from position C to third position E, as depicted by arrow 28 in FIG. 9, is depicted in FIG. 8B by portion CE of the hysteresis curve thereof. The movement of second end 16 from third position C back to first position A is depicted by portion EA of the hysteresis curve of FIG. 8B. In response to moving second end 16 of wire 10 one or more cycles between second position B and third position E in the above described manner, user 20 will realize the applied force versus displacement hysteresis curve defined by points B, C, D, E, F, A, G, B, C . . . of FIG. 8B. In contrast, if user 20 releases second end 16 of wire 10 at a position slightly below sight line 24, after moving second end 16 from third position E toward and below first position A, user 20 will realize the applied force versus displacement curve of points B, C, D, E, F, A, G and O in FIG. 8B.

Had wire 10 had a coefficient of elasticity near 1.0, the cyclical behavior of wire 10 realized by user 20 in response to the application of palpatory forces to second end 16 in the manner described above would have been the hysteresis plot shown in FIG. 8A. Conversely, if wire 10 had a coefficient of elasticity near 0.0, the cyclical behavior of wire 10 realized by user 20 in response to the application of palpatory forces to second end 16 by user 20 in the manner described above would have been the hysteresis plot shown in FIG. 8C.

It is to be appreciated that apparatus 2 is not designed as a precision instrument. Rather, it is designed to provide the sense and feel of elastic, semi-elastic and/or inelastic (hysteretic) materials, as the case may be, to user 20. By understanding these differences, user 20 becomes more adept at palpation of living and non-living tissue and of inorganic material. With a common model, palpating users can better understand the differences between hysteresis and elasticity. This can then greatly improve inter-rater reliability when palpating living and non-living tissue and inorganic materials. The plots shown in FIGS. 8A-8C are realized from data that is relative, while displacement measures are estimates. However, the sense and feel is exacting and quantifiable, just as it is when palpating living tissue where no force meter or displacement scale is typically utilized.

A series of individual apparatuses 2, each having a wire 10 with a different coefficient of elasticity attached to elevating block 6 can be provided to enable users to readily detect different hyteresis loops of the types shown in FIGS. 7A-8C. Also or alternatively, a single apparatus 2 can be utilized with exchangeable wires 10, each of which has a different coefficient of elasticity.

A method of utilizing apparatus 2 will now be described with reference to FIGS. 1-9.

Initially, user 20 positions himself to view along sight line 24. Next, user 20 moves second end 16 of wire 10 so that it is in alignment with sight line 24 at first position A. Thereafter, user 20 presses downward on second end 16 of wire 10 while noticing or detecting how much force is required to displace it relative to sight line 24. User 20 can use measure 12 as a calibrated scale to approximate and give a value to the displacement of second end 16.

User 20 continues pressing second end 16 downward until it just barely reaches, but does not touch, surface 18 of base 4. At this position, i.e., second position B, user 20 notes or detects the force required to hold second end 16 at second position B. User 20 then withdraws the force while noting the response of second end 16 relative to sight line 24.

Next, user 20 presses or pulls upwardly on second end 16 of wire 10 while noticing or detecting how much force is required to displace second end 16 relative to sight line 24. Measure 12 can be utilized as a calibrated scale to approximate and give a value to this displacement. As shown in FIG. 9, measure 12 can extend above and below the top surface of elevating block 6 upon which first end 14 of wire 10 rests.

When second end 16 of wire 10 is aligned with sight line 24, i.e., at first position A, user 20 notes or detects the force required to hold second end 16 at first position A.

Next, user 20 applies an increasing upward force to second end 16 until it reaches maximum displacement above sight line 24 equivalent to the maximum displacement that was reached below sight line 24 earlier. At this maximum displacement, i.e., at third position E, above sight line 24, user 20 notes or detects the force required to hold second end 16 there. Next, user 20 withdraws the force and notes the response of second end 16 relative to sight line 24.

Thereafter, user 20 presses downward on second end 16 and notices or detects how much force is required to displace it relative to sight line 24. When second end 16 is aligned with sight line 24, user 20 notes or detects the force required to hold it there.

The process of moving second end 16 of wire 10 from first position A to second position B, to third position E, and then back to first position A, while noting throughout the movement of second end 16 the amount of force applied thereto and/or the position of second end 16 in the absence of applied force continues for as many cycles or parts of a cycle as desired.

Based on the force versus displacement detected or realized by user 20 throughout or at various points during the movement of second end 16 of wire 10 in the manner described above, user 20 can realize a hysteresis loop for the particular wire 10 being used.

Figure 10:
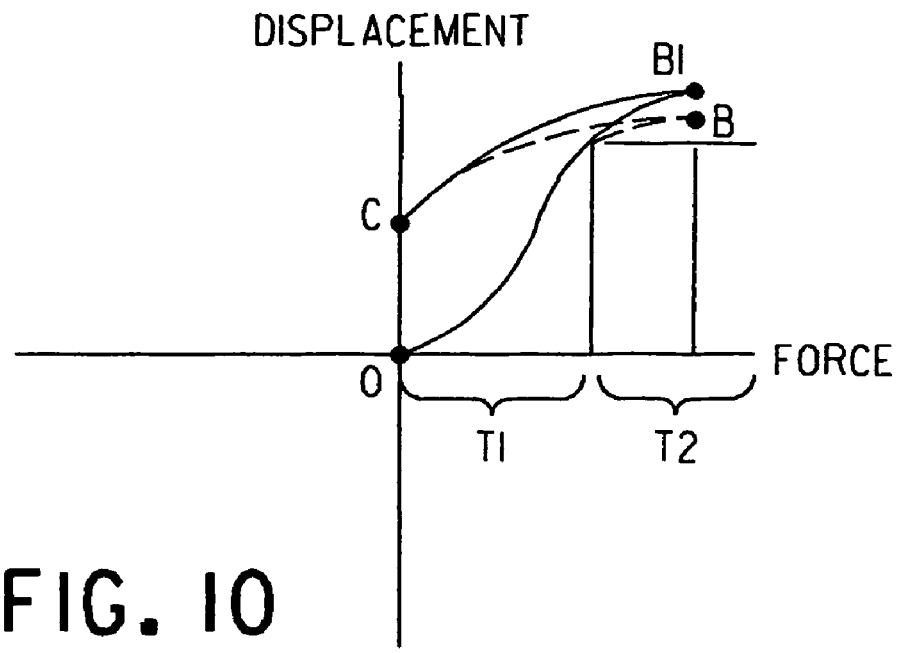
FIG. 10 shows first quadrant hysteresis curves realized from palpating a single layer of tissue (solid line) and a pair of tissue layers (dashed line)

With reference to FIG. 10 and with continuing reference to all previous figures, palpating tissue on the forearm, calf of the leg, belly, etc., produces only a so-called first quadrant portion of the hysteresis loop as also shown in FIGS. 7A-7C. Palpating surface tissue of the arm of a healthy and normal subject where the tissue coefficient of elasticity is uniform produces a curve that rises upward into the first quadrant as more palpatory force is applied. As this palpatory force is withdrawn, the curve moves back toward the Y axis, not retracting itself and at zero palpatory force intersecting the positive Y axis between the Y value at the start of palpation and the Y value that occurred at maximum applied palpatory force.

In order to produce a full hysteresis loop of one of the types shown in FIGS. 8A-8C, it is necessary to raise the tissue upward so that the hysteresis curve slopes downward to a peak in the third quadrant and then lower the tissue for the hysteresis curve to move toward the Y axis intersect on the negative Y axis at zero palpatory force, which occurs between the origin "O" and absolute negative Y value at maximum negative palpatory force in the third quadrant, and then press downward again to drive the curve to the previous maximum point in the first quadrant. However, this is not done in practice and palpation on flat tissue surface produces only the first quadrant of the hysteresis loop.

Deeper tissue structure results in a layering of tissue, with each tissue structure having its own coefficient of elasticity. For example, assume two layers of tissue where the lower layer has a higher coefficient of elasticity than the surface layer. As palpatory force begins, the curve follows the hysteretic response shown in any one of FIGS. 7A-7C. At the point where the deeper tissue structure is engaged, increasing palpatory force produces less displacement because of the higher coefficient of elasticity. As the palpation force increases, a first quadrant hystersis response ensues with the combination of the coefficients of elasticity of both layers of tissue.

Figure 11:
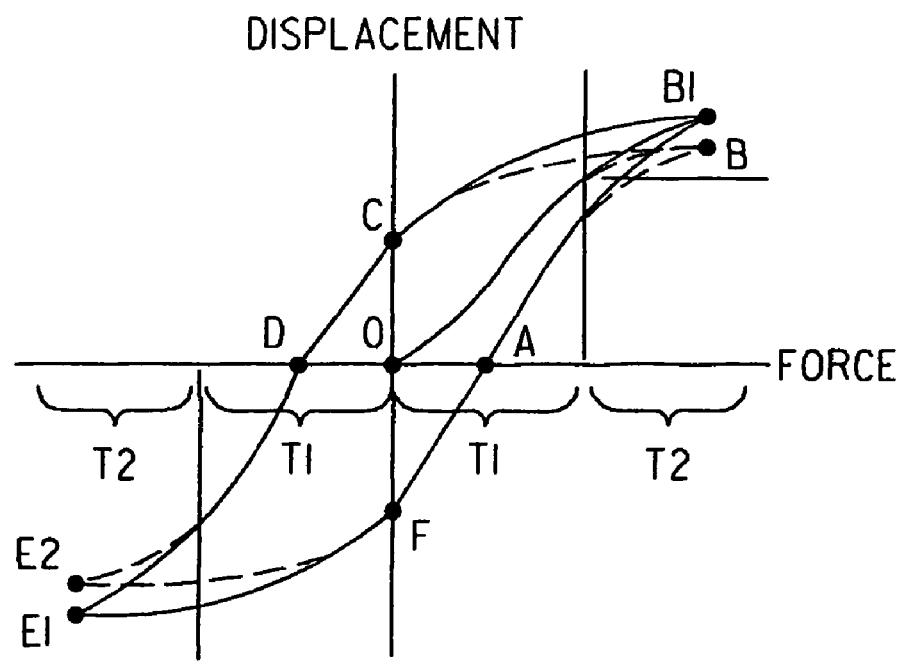
FIG. 11 are full hysteresis loops realized in response to palpating a single layer of tissue (solid line) and a pair of tissue layers (dashed line)

FIGS. 10 and 11 show a partial hysteresis loop and a full hysteresis loop, respectively, wherein in each figure the solid line represents the hysteresis loop that is realized for a single layer of tissue T1 having only a single coefficient of elasticity, while the dashed line appended to the solid line illustrates the hystersis loop that would be realized when palpating layered tissue, e.g., tissue T1 and tissue T2.

To obtain the entire hysteresis loop shown in FIG. 11 from tissue under assessment, bilateral tissue movement from palpatory force must be possible. This occurs with rotation around a joint as disclosed in U.S. patent application Ser. No. 11/159,696, filed Jun. 23, 2005, which is incorporated herein by reference, or when the pelvic area is rotated against the frontal plane of the thorax as disclosed in U.S. Pat. No. 6,159,168, which is also incorporated herein by reference.

Thus, any part of the body that can be moved in two opposite directions has a potential of producing a complete hysteresis loop of the type shown in FIG. 11 and/or in FIGS. 8A-8C.

A second embodiment elastic hysteretic palpatory training apparatus 42 for generating the partial hysteresis loop of FIG. 10 or the full hysteresis loop of FIG. 11 will now be described with reference to FIG. 12. Apparatus 42 includes base 4, elevating block 6 and measure 12 all configured in the same manner as apparatus 2 discussed above. In addition, apparatus 42 includes a plurality of different wires 44, 46 and 48 positioned in vertical spaced relation, with the first ends of wires 44-48 crimped together in a sleeve 50 which can be positioned inside of a suitable aperture 52 of elevating block 6 facing sighting device 8. In apparatus 42, sight line 24 extends between the top of sighting device 8 and approximately the center of sleeve 50. The description of wires 44-48 being connected by sleeve 50, however, is not to be construed as limiting the invention since it is envisioned that each wire 44-48 can be received in a separate aperture of elevating block 6 or on the top surface of elevating block 6, whereupon wires 44-48 are stacked in vertical spaced relation.

In use of apparatus 42, user 20 applies a downwardly directed palpatory force on the end of center wire 44 opposite sleeve 50. As wire 44 moves downward in response to this applied palpatory force, it engages wire 46. Thereafter, in response to the application of an increasing downwardly directed palpatory force to wire 44, wires 44 and 46 move in concert downwardly until the end of one or both of wires 44 and 46 opposite sleeve 50 are just above surface 18 of base 4.

Next, the downwardly applied palpatory force is withdrawn whereupon, depending on the elasticity of one or both of wires 44 and 48, one or both of said wires may exhibit some residual displacement below sight line 24. Thereafter, the user applies an upwardly directed palpatory force to the end of wire 44 opposite sleeve 50 whereupon wire 44 moves upwardly away from wire 46 and into contact with wire 48. Thereafter, in response to the application of an increasing upwardly directed palpatory force on wire 44, wires 44 and 48 move together in concert, desirably about the same distance as wires 44 and 46 were moved in concert toward surface 18 of base 4.

Next, the upwardly directly palpatory force is withdrawn whereupon, depending on the elasticity of one or both of wires 44 and 48, one or both of said wires may exhibit some residual displacement above sight line 24. Whether or not each of wires 44, 46 and 48 exhibits residual displacement depends on the coefficient of elasticity of the material forming each wire. Moreover, if wire 46 or wire 48 has a greater coefficient of elasticity than wire 44, when the palpatory force on wire 44 is withdrawn, the wire 46 or 48 in contact with wire 44 may move wire 44 toward the sight line 24 even though the elastic properties of wire 44 would ordinarily not cause it to move from its residual displacement absent its being in contact with wire 46 or 48. Conversely, if wire 44 has a coefficient of elasticity that is greater than one or both of wire 46 and wire 48, when the applied palpatory force is withdrawn, wire 44 may move out of contact with wire 46 or wire 48 due to the differences in the residual displacement of wire 44 and wire 46 or wire 48.

By detecting applied force versus displacement of the end of wire 44 opposite sleeve 50, a user can realize the partial and/or full hysteresis plots shown in FIGS. 10 and 11, respectively.

Figure 13:
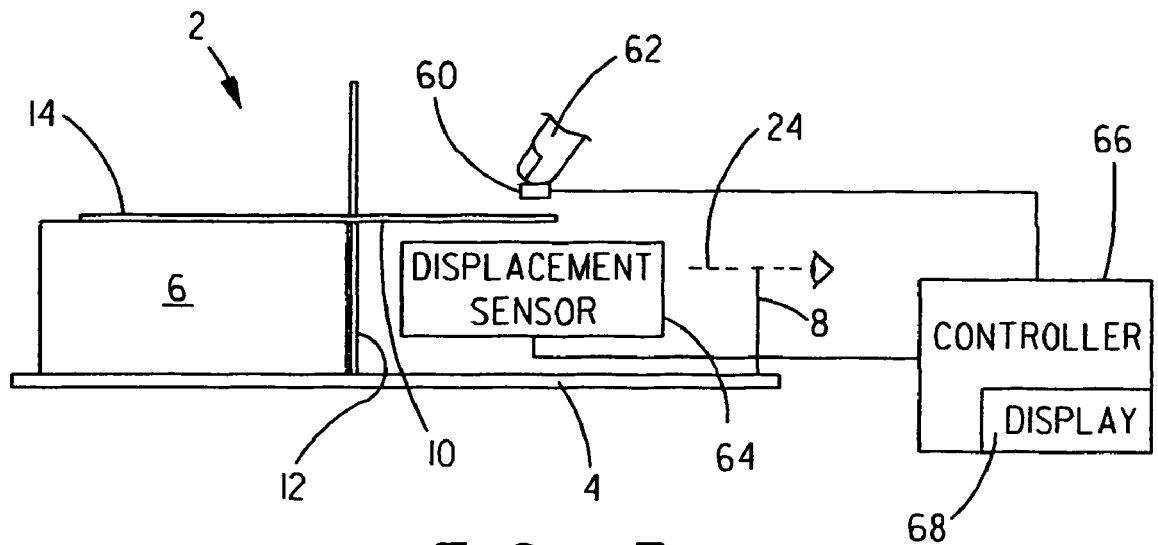
FIG. 13 is a side view of the apparatus of FIG. 1 showing the use of a force sensor and a displacement sensor therewith.

With reference to FIG. 13 and with reference back to FIG. 1, if desired, the process of obtaining all or part of a hysteresis curve can be automated. In one non-limiting embodiment, a force sensor 60 can be applied to one or more fingers 62 of a user and a displacement sensor 64 can be positioned and/or connected in an operative manner to detect movement of second end 16 of wire 10. Displacement sensor 64 can be any type of suitable and/or desirable displacement sensor such as, without limitation, a linear variable differential transformer (LVDT), an eddy current displacement sensor, an inductive displacement sensor, a capactive displacement sensor, a laser displacement sensor, or any other form of contacting or non-contacting displacement sensor. Depending on the type of displacement sensor utilized, displacement sensor 64 may be connected to a controller 66 which can include the necessary hardware and/or software for enabling measurements of the displacement of wire 10 to be made by way of displacement sensor 64. In addition, the output of force sensor 60 can be connected to controller 66 which can be operative for acquiring data output by force sensor 60 and displacement sensor 64 during palpation of wire 10. If desired, controller 66 can include a display 68 associated therewith for displaying a plot of: force versus displacement output by force sensor 60 and displacement sensor 64; force as a function of time; and/or displacement as a function of time. The display of force versus displacement is particularly advantageous since user 20 can visualize the partial and/or full hysteresis plot(s) that he realizes in response to the application of one or more cycles of upwardly and/or downwardly directed palpatory forces to second end 16 of wire 10.

Figure 12:
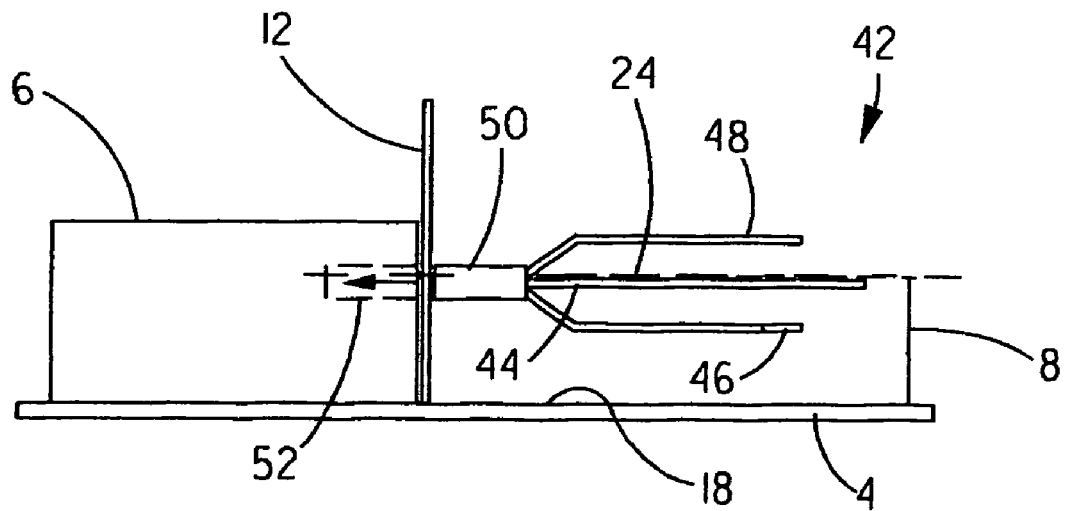
FIG. 12 is a second embodiment elastic hysteretic palpatory training apparatus for simulating palpation of multiple layers of tissue.

While not shown, it is to be appreciated that force sensor 60, displacement sensor 64 and controller 66 can also or alternatively be utilized in connection with the elastic hysteretic palpatory training apparatus 42 shown in FIG. 12.

While FIG. 13 shows force sensor 60 on finger 62, it is to be appreciated that force sensor 60 can also or alternatively be disposed on one or more fingers/fingertips, the hand and/or any other suitable and/or desirable sensory part of user 20 that user 20 may use for palpation or at a suitable location on wire 10. Accordingly, the illustration of force sensor 60 on finger 62 is not to be construed as limiting the invention.

Figure 14:
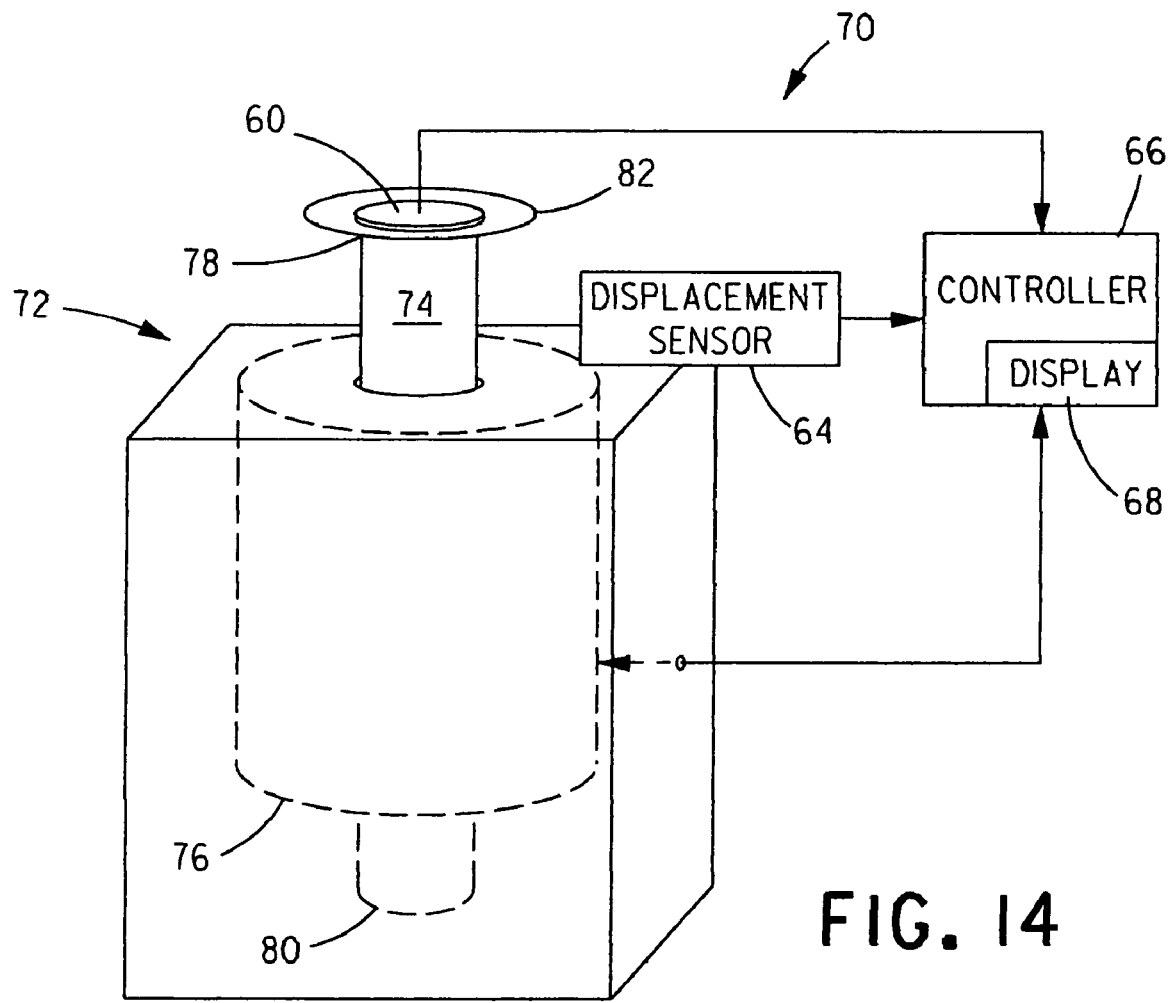
FIG. 14 shows a third embodiment elastic hysteretic palpatory training device that can emulate hysteresis of one or more layers of tissue.

With reference to FIG. 14, another embodiment elastic hysteretic palpatory training apparatus 70 includes an actuator 72 having a plunger 74 received within the core of a solenoid 76. A force sensor, like force sensor 60, can be positioned on a first end 78 of plunger 74. The output of force sensor 60 can be connected to a controller, like controller 66. A contacting or non-contacting displacement sensor, like displacement sensor 64, can be disposed in operative relation to plunger 74 to measure the movement thereof in response to the application of a palpatory force on sensor 60. Acting under the control of controller 66, solenoid 76 can be controlled to emulate the response of a single wire, like wire 10, or a plurality of wires, like wires 44-48, in response to a palpatory force being applied to force sensor 60. To this end, controller 66 can be configured to control the electrical power supplied to solenoid 76 as a function of the outputs of force sensor 60 and displacement sensor 64 whereupon a user palpating plunger 74 via force sensor 60 realizes a desired force versus displacement hysteresis curve. For example, controller 66 can be programmed to control solenoid 76 to generate a force versus displacement profile having the shape of one or more of the hysteresis curves shown in FIGS. 7A-8C, one-at-a-time. Controller 66 can include display 68 for displaying one or more of the hysteresis curves shown in FIG. 7A-8C to user 20.

To facilitate producing the full hysteresis curves shown in FIGS. 8A-8C, first end 78 of plunger 74 can include a collar or other suitable means 82 for enabling an upwardly directed palpatory force to be applied to first end 78 of plunger 74. Also or alternatively, second end 80 of plunger 74 can include another force sensor (not shown) coupled to controller 66 for enabling a palpatory force to be applied to second end 80.

Figure 15:
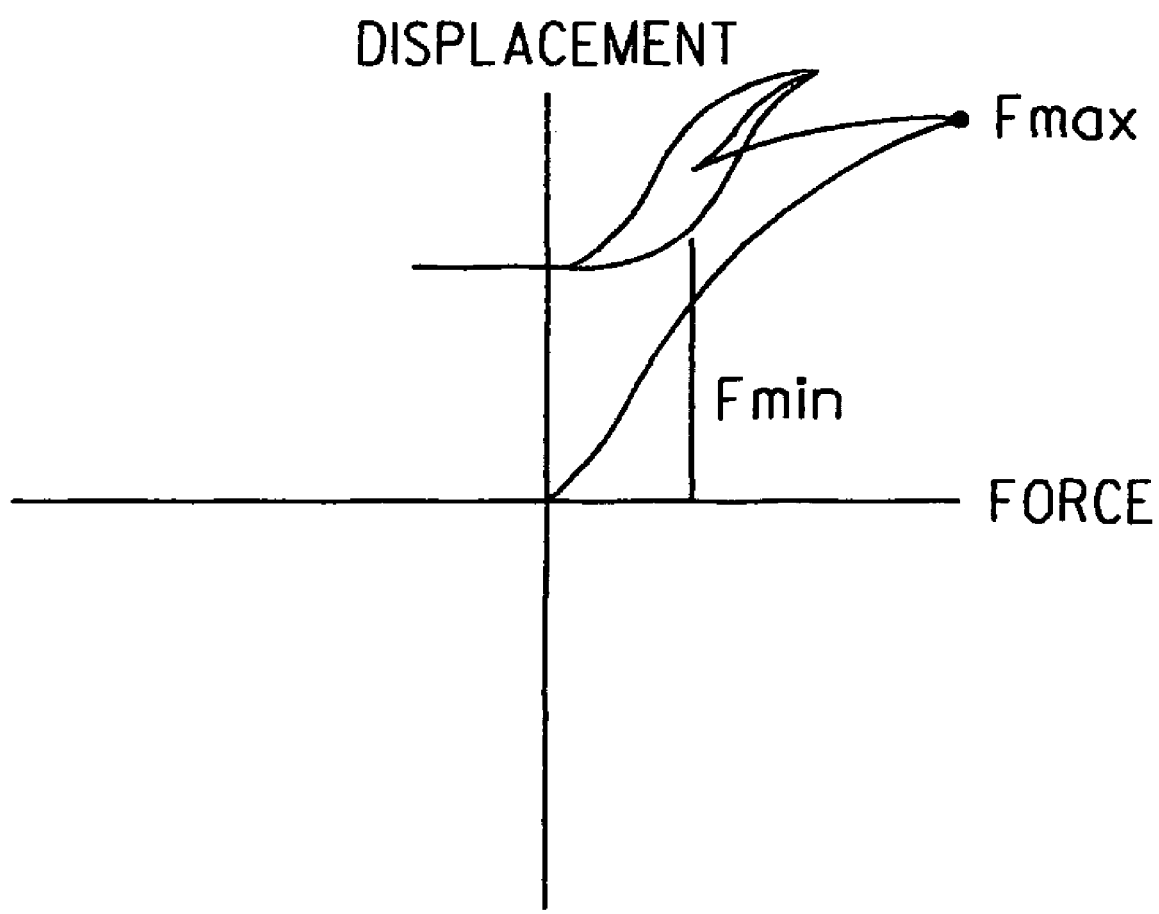
FIG. 15 shows a full hysteresis loop that can be produced in a first quadrant of a force versus displacement plot that may be realized utilizing any of the apparatuses shown in FIG. 1, 12 or 14.

With reference to FIG. 15, in practice, practitioners seek out the entire hysteresis loop because it is the area within the loop that conveys diagnostic information. A practitioner can realize an entire or full hysteresis loop simply by applying a downward palpatory force and then withdrawing the palpatory force only partially whereupon the tissue is capable of resisting the partially withdrawn palpatory force. This is illustrated in FIG. 15 where the practitioner applies a palpatory force to Fmax. The practitioner then releases the force until Fmin and then applies force again, but not up to Fmax, and then releases the force to below Fmin but not to zero. The practitioner can cycle the applied palpatory force between these levels to create the first quadrant hysteresis loop shown in FIG. 15. This palpation can be simulated by any of apparatuses 2, 42 and 70 described above.

As can be seen, the present invention enables a user to be trained to recognize various elastic and hysteretic effects in tissue. In practice, a user can palpatate a number of different wires 10, 44, 46 and 48 having various combinations of coefficients of elasticity, ranging from near 0.0 to near 1.0, whereupon the user can experience and, thereby, learn to detect differences in the hystersis of various types of tissue. Also or alternatively, controller 66 of apparatus 70 in FIG. 14 can be programmed to enable a user to select a particular hysteresis curve for actuator 72 to emulate. Thus, by way of programming, controller 66 can be controlled to cause plunger 74 to emulate one or more desire(s) hysteresis curves for one or more materials having coefficients of elasticity from near 0.0 to near 1.0.

The invention has been described with reference to the preferred embodiments. Obvious modifications and alterations will occur to others upon reading and understanding the preceding detailed description. For example, while the present invention has been described with reference to palpation by way of one or more fingers/fingertips, the invention is not to be construed as being so limited since it is envisioned that palpation can be performed by the hand of a practitioner or any other suitable and/or desirable sensory part of the practitioner's body. It is intended that the invention be construed as including all such modifications and alterations insofar as they come within the scope of the appended claims or the equivalents thereof.

The invention claimed is:

1. A hysteretic palpatory training apparatus comprising:

means for hysteretically resisting an applied palpatory force;

means for supporting the means for hysteretically resisting such that said means for hysteretically resisting is moveable in response to the application of the palpatory force; and means for measuring displacement of the means for hysteretically resisting in response to the application of the palpatory force thereto, wherein the means for hysteretically resisting includes one of the following:

a wire having a coefficient of elasticity between 0.0 and 1.0, exclusive, wherein said wire is disposed on the means for supporting for hysteretically deforming transverse to a longitudinal axis of said wire; or a series of wires supported by the means for supporting in a manner to be engaged one-at-a-time in response to the application of an increasing palpatory force on one of said wires in said series, wherein each wire has a coefficient of elasticity between 0.0 and 1.0, exclusive, and each wire is disposed on the means for supporting for hysteretically deforming transverse to a longitudinal axis of said wire.

2. The apparatus of claim 1, wherein the palpatory force is applied via a finger, fingertip, and or any sensory part of a user that is utilized for applying the palpatory force of a user.

3. The apparatus of claim 1, further including means for measuring an amount of palpatory force applied to the means for hysteretically resisting.

4. The apparatus of claim 3, wherein the means for measuring is disposed on one of:

a finger, fingertip, hand or any sensory part of a user that is utilized for applying the palpatory force; and the means for hysteretically resisting.

5. The apparatus of claim 1, wherein the means for hysteretically resisting is partially elastic.

6. The apparatus of claim 1, wherein the means for measuring displacement includes at least one of:

the combination of a measure having graduations positioned along a direction of displacement of the means for hysteretically resisting in response to the application thereto of the palpatory force and a sighting device spaced from said measure and said means for supporting, said sighting device configured to coact with said measure and/or said means for supporting for enabling a user to establish a visual sight plane from which displacement of the means for hysteretically resisting can be determined by reference to the graduations of the measure; or means for electronically measuring displacement of the means for hysteretically resisting.

7. The apparatus of claim 6, wherein the means for electronically measuring displacement includes one of an LVDT, an eddy current displacement sensor, an inductive displacement sensor, a capacitive displacement sensor, and a laser displacement sensor.

8. A hysteretic palpatory training apparatus comprising:

an elongated wire having a coefficient of elasticity between 0.0 and 1.0, exclusive;

means for supporting a first part of the wire with a second part of the wire spaced above a surface;

a sighting device spaced from the means for supporting adjacent the second part of the wire, the combination of the sighting device and the means for supporting defining a sight plane; and a measure disposed between the sighting device and the means for supporting, the measure having graduations between the surface and the first part of the wire for enabling a user palpating the second end of the wire to determine a displacement thereof with respect to the sight plane.

9. The apparatus of claim 8, wherein the means for supporting is a block coupled to the surface wherein the first end of the wire is either coupled to a surface of the block or is received in an aperture defined in the block.

10. The apparatus of claim 8, further including a plurality of wires disposed on the means for supporting in a manner to be engaged one-at-a-time in response to movement of one of said wires of said plurality of wires in a first direction, wherein each wire has a coefficient of elasticity between 0.0 and 1.0, exclusive.

* * * * *

Disclaimer

7,727,170 - Michael J. Warner, Johnstown, PA (US); and James A. Mertz, Brick, NJ (US). ELASTIC HYSTERETIC PALPATORY TRAINING APPARATUS AND METHOD OF USE THEREOF. Patent dated June 1, 2010. Disclaimer filed June 14, 2010, by the Inventor.

Hereby enters the term of this patent not to exceed beyond the expiration date of serial number 12/378,855 filed Feb. 20, 2009.

*(Official Gazette, August 3, 2010)*